(12) United States Patent
Grosser et al.

(10) Patent No.: US 8,891,533 B2
(45) Date of Patent: Nov. 18, 2014

(54) METHODS SYSTEMS AND APPARATUSES FOR DYNAMICALLY TAGGING VLANS

(75) Inventors: Donald B Grosser, Apex, NC (US); Shankara Ramamurthy, Chennai (IN)

(73) Assignee: Extreme Networks, Inc., San Jose, CA (US)

( * ) Notice: Subject to any disclaimer, the term of this patent is extended or adjusted under 35 U.S.C. 154(b) by 114 days.

(21) Appl. No.: 13/490,873

(22) Filed: Jun. 7, 2012

(65) Prior Publication Data
US 2013/0329741 A1 Dec. 12, 2013

(51) Int. Cl.
H04L 12/54 (2013.01)

(52) U.S. Cl.
CPC ........................................ *H04L 12/56* (2013.01)
USPC .................................................... 370/395.53

(58) Field of Classification Search
CPC .............. H04L 12/465; H04L 12/4654; H04L 12/4658
USPC ..................................................... 370/395.53
See application file for complete search history.

(56) References Cited

U.S. PATENT DOCUMENTS

| | | | |
|---|---|---|---|
| 7,386,628 B1 * | 6/2008 | Hansell et al. ................ | 709/238 |
| 2004/0054655 A1 * | 3/2004 | Brown .............................. | 707/1 |
| 2005/0190788 A1 | 9/2005 | Wong | |
| 2006/0274744 A1 | 12/2006 | Nagai | |
| 2007/0121655 A1 * | 5/2007 | Jin ................................ | 370/401 |
| 2009/0141729 A1 * | 6/2009 | Fan ............................... | 370/401 |
| 2011/0085860 A1 * | 4/2011 | Gregerson ..................... | 404/107 |
| 2012/0163165 A1 * | 6/2012 | Ra et al. ........................ | 370/225 |
| 2013/0170359 A1 * | 7/2013 | Ino et al. ....................... | 370/241 |

FOREIGN PATENT DOCUMENTS

WO  WO-2007133786  11/2007

OTHER PUBLICATIONS

International Search Report and Written Opinion for International Patent Application No. PCT/US2013/044793, Mailed Oct. 10, 2013, 10 pages.

* cited by examiner

*Primary Examiner* — Huy D Vu
*Assistant Examiner* — Bao G Nguyen
(74) *Attorney, Agent, or Firm* — Blakely, Sokoloff, Taylor & Zafman

(57) ABSTRACT

Systems, mechanisms, apparatuses, and methods are disclosed for dynamically tagging VLANs. For example, in one embodiment such means include: means for receiving a packet having identified therein a source Media Access Control (MAC) address and a Virtual Local Area Network (VLAN) Identifier, wherein the VLAN identifier corresponds to a VLAN which is non-existent on a network switch; means for modifying the packet received to include two VLAN tags, a first VLAN tag corresponding to the VLAN identifier identified within the packet received and a second VLAN tag, distinct from the first; means for determining no forwarding database entry exists for the modified packet; and means for creating the VLAN on the network switch to handle received packets tagged with the VLAN identifier.

30 Claims, 7 Drawing Sheets

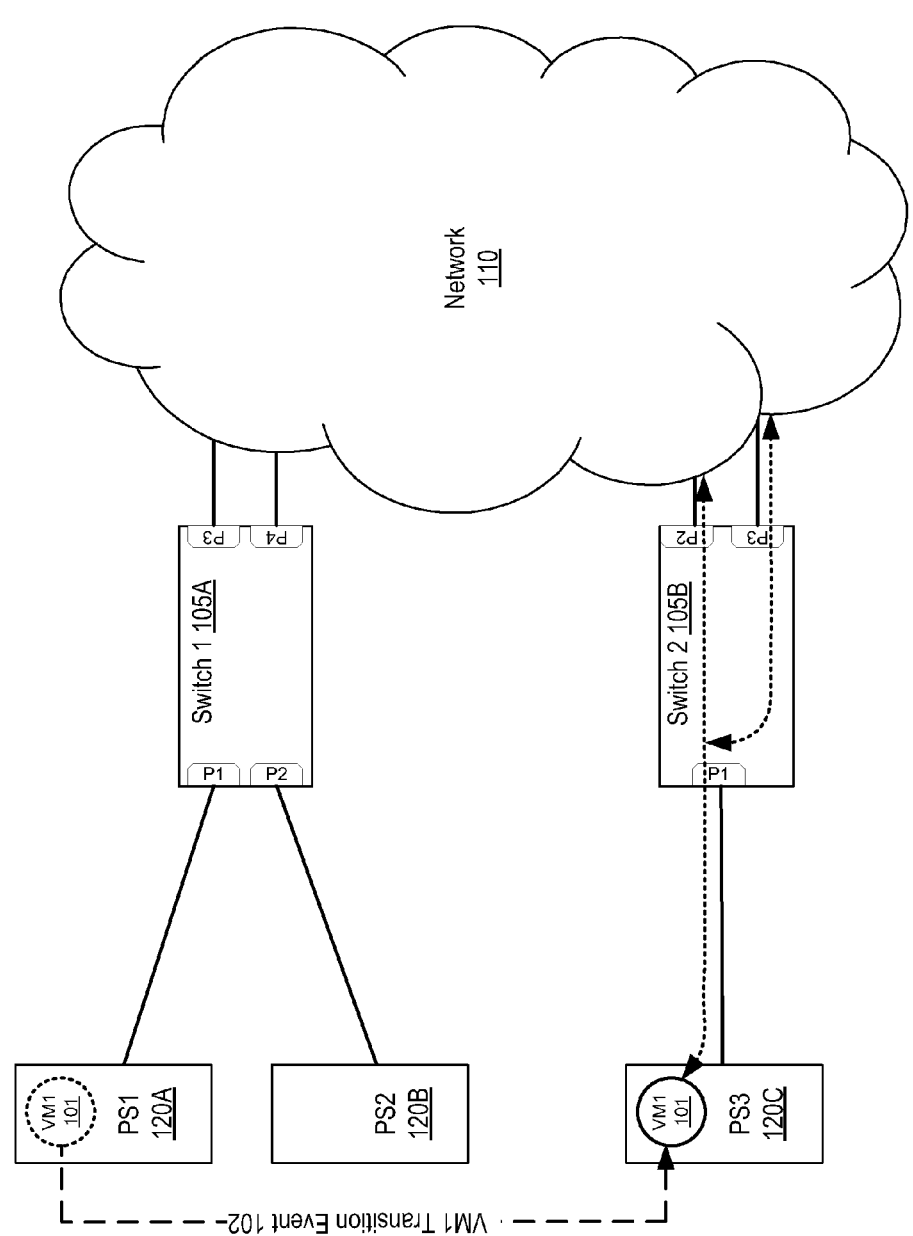

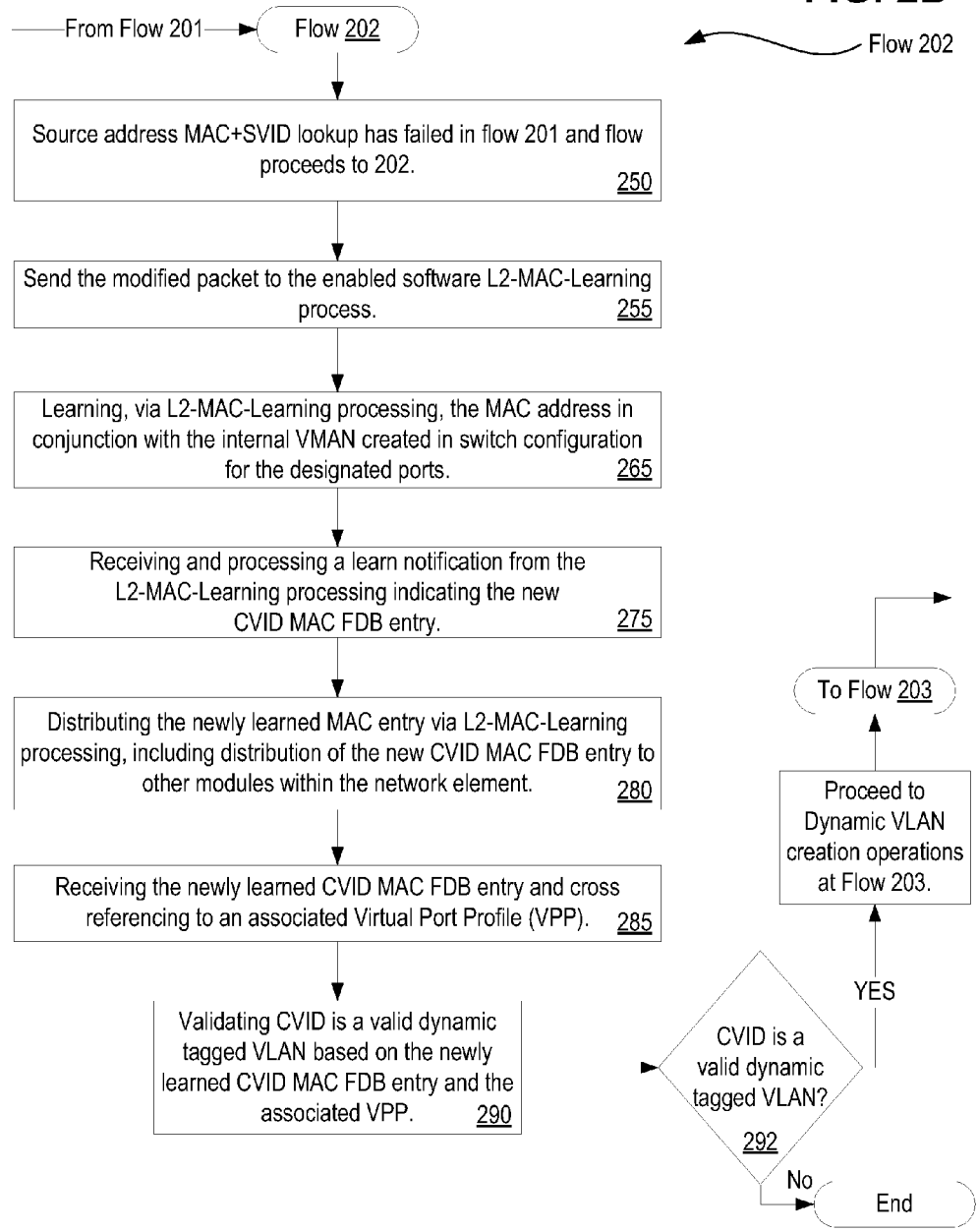

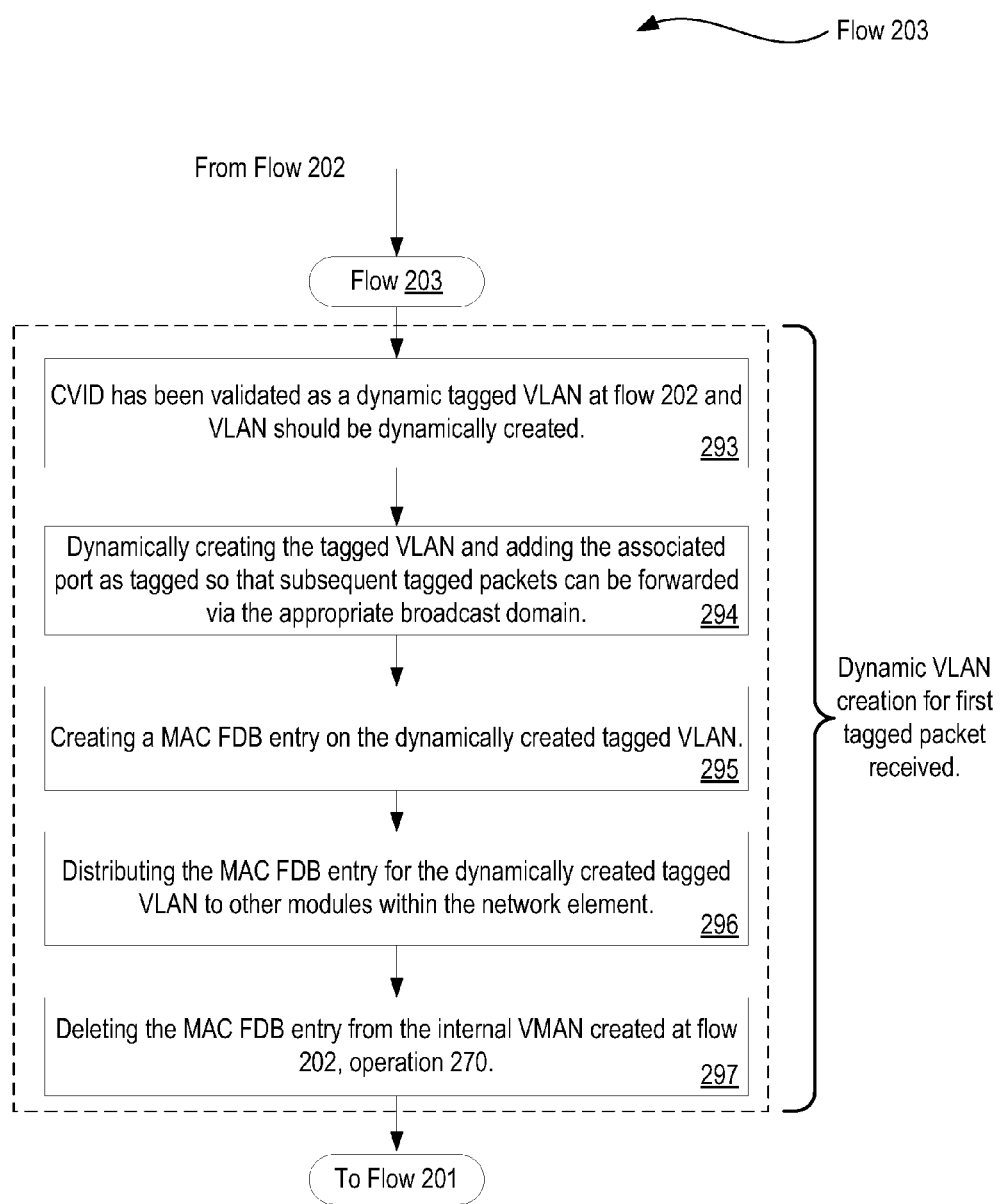

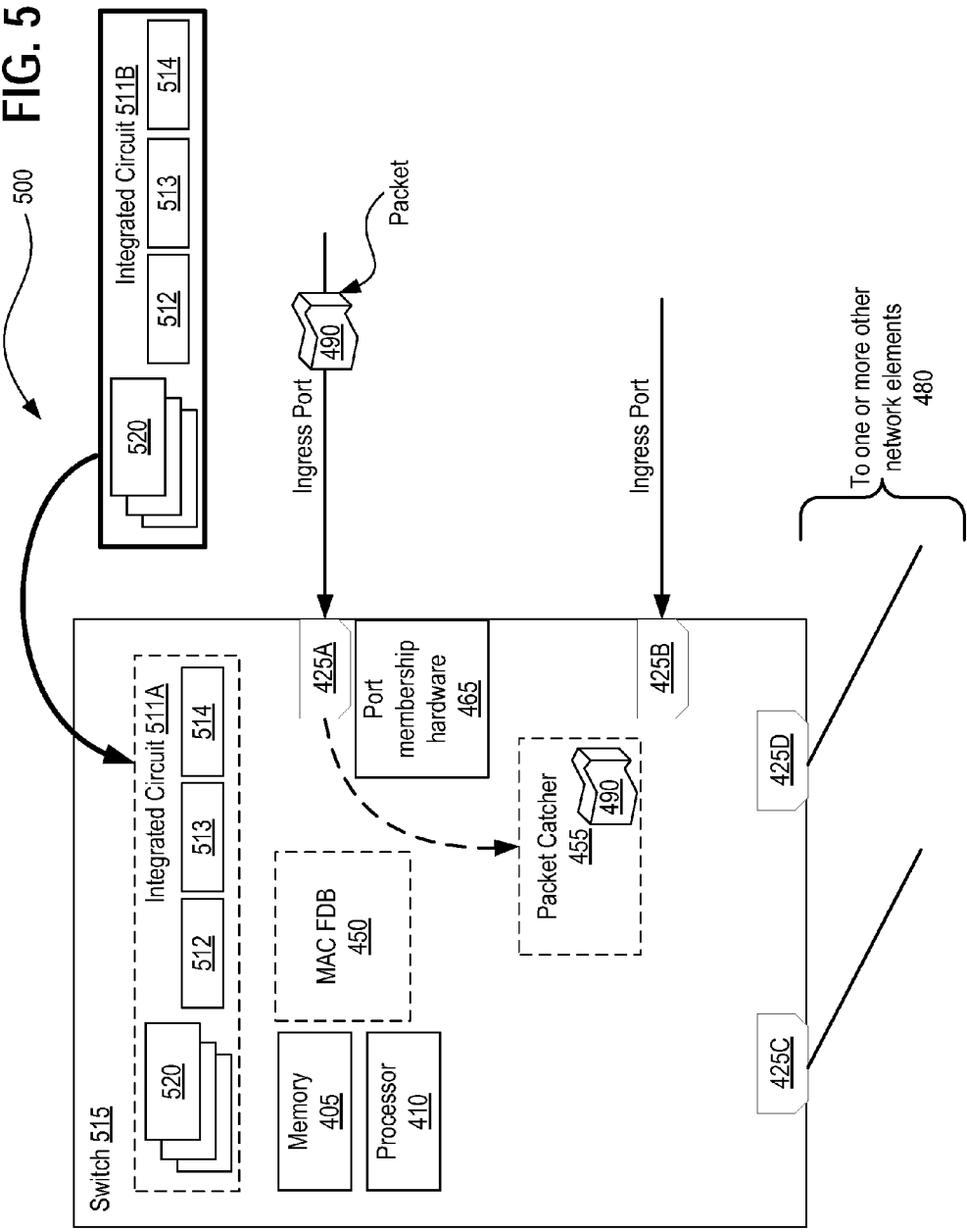

METHODS SYSTEMS AND APPARATUSES FOR DYNAMICALLY TAGGING VLANS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments relate generally to the field of networking, and more particularly, to methods, systems, and apparatus for dynamically tagging Virtual Local Area Networks (VLANs).

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to claimed embodiments.

A virtual local area network ("virtual LAN" or "VLAN," is a group of hosts with a common set of requirements, which communicate as if they were attached to the same broadcast domain, regardless of their physical location. A VLAN has the same attributes as a physical local area network (LAN), but it allows for end stations to be grouped together even when not on the same network switch.

Physically replicating the functions of a VLAN would ordinarily require separate and parallel collections of network cables and equipment separate from the primary network, a prospect which is costly and complex. Unlike a physically separate network, VLANs share bandwidth as payload traverses the same underlying physical connections. For example, two separate one-gigabit VLANs that share a single one-gigabit interconnection will encounter reduced throughput and increased contention and network congestion due to such a sharing arrangement, with the benefit of not having to physically reproduce network infrastructure.

Common network behaviors such as configuring switch ports, tagging frames when entering VLAN, looking up MAC tables to switch/flood frames to trunk links, and untagging when exit from VLAN are virtualized by VLAN compatible components.

Conventional VLANs are configured and established in advance, for example, by a network administrator, using VLAN compatible components.

A dynamic VLAN is a VLAN which is automatically created by a network switch and provisioned upon receipt and processing of a packet from a network interface. Unlike conventional VLANs, dynamic VLANs do not enjoy a well supported standard and, to date, multiple vendors have attempted to solve the problem of supporting dynamic VLANs through a variety of applications, with varying degrees of functionality and compatibility.

While work has advanced to some degree in the area of dynamic VLANs, current implementations are limited to supporting only untagged dynamic VLANs. Conventional solutions use a dummy or catcher VLAN for a specified port and upon encountering an untagged packet, a VLAN assignment will be established. However, this results in an untagged packet being assigned to a VLAN before it is actually a member of the VLAN. Conversely, tagged VLANs need to be pre-configured before the initial packet processing can occur, which defeats the purpose of the dynamic VLAN feature, and renders support for dynamic VLANs useless when packets associated with tagged VLANs are encountered.

The present state of the art may therefore benefit from the methods, systems, and apparatuses for dynamically tagging VLANs as is described herein.

BRIEF DESCRIPTION OF THE DRAWINGS

Embodiments are illustrated by way of example, and not by way of limitation and can be more fully understood with reference to the following detailed description when considered in connection with the figures in which:

FIG. 1 illustrates an exemplary architecture in accordance with which embodiments may operate;

FIGS. 2A, 2B, and 2C illustrate exemplary process flows for dynamically tagging Virtual Local Area Networks (VLANs) in accordance with which embodiments may operate;

FIG. 5 illustrates an alternative exemplary architecture of a network switch to receive an integrated circuit in accordance with which embodiments may operate.

DETAILED DESCRIPTION

Figure 2A:
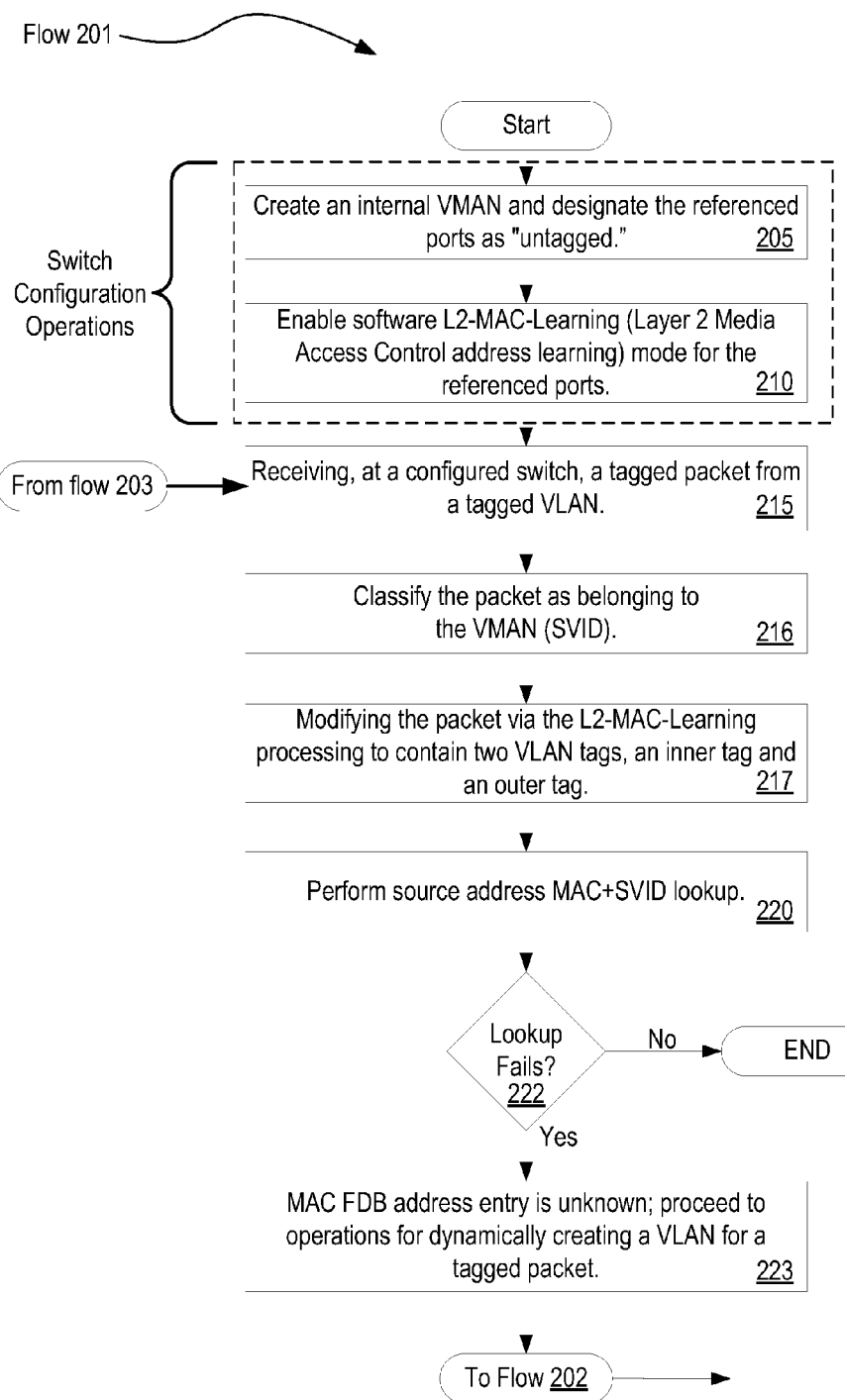

Described herein are systems, apparatuses, and methods for dynamically tagging VLANs. In accordance with one embodiment, such means include: means for receiving a packet having identified therein a source Media Access Control (MAC) address and a Virtual Local Area Network (VLAN) Identifier, wherein the VLAN identifier corresponds to a VLAN which is non-existent on a network switch; means for modifying the packet received to include two VLAN tags, a first VLAN tag corresponding to the VLAN identifier identified within the packet received and a second VLAN tag, distinct from the first; means for determining no forwarding database entry exists for the modified packet; and means for creating the VLAN on the network switch to handle received packets tagged with the VLAN identifier. An SVID tag refers to a "Service VLAN Identifier tag."

In the following description, numerous specific details are set forth such as examples of specific systems, languages, components, etc., in order to provide a thorough understanding of the various embodiments. It will be apparent, however, to one skilled in the art that these specific details need not be employed to practice the disclosed embodiments. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the above embodiments may be used alone or together with one another in any combination. Although various embodiments may have been partially motivated by deficiencies with conventional techniques and approaches, some of which are described or alluded to within the specification, such embodiments need not necessarily address or solve any of these deficiencies, but rather, may address only some of the deficiencies, address none of the deficiencies, or be directed toward different deficiencies and problems where are not directly discussed.

Conventional solutions for dynamic VLANs are limited to supporting only untagged dynamic VLANs with tagged VLANs requiring pre-configuration of a desired VLAN before the initial packet processing for a tagged VLANs can occur, thus rendering support for dynamic VLANs useless when packets associated with tagged VLANs are encountered.

Accordingly, taught herein are solutions for dynamically tagging VLANs such that they may be accommodated by dynamic VLAN functionality, and specifically so that already tagged VLANs lacking a pre-configuration for initial packet processing can be accommodated by a network switch which automatically creates and provisions a dynamically generated VLAN responsive to receipt and processing of an already tagged VLAN packet from a network interface.

FIG. 1 illustrates an exemplary architecture 100 in accordance with which embodiments may operate and more specifically, illustrates the problem of dynamic VLAN creation in the context of already tagged VLAN packets.

The architecture 100 depicts a network 110 communicatively interfaced to each of two switches, switch 1 105A via ports P3 and P4 and further in which the network is communicatively interfaced with switch 2 105B via ports P2 and P3. Switch 1 105A in turn is communicatively interfaced to Physical Servers (PS), including each of PS1 120A via port P1 and PS2 120B via port P2 while switch 2 105B is communicatively interfaced to PS3 120C via port P1.

When encountering untagged VLANs for which no pre-configuration exists, a "catcher" dummy VLAN is established having a sole responsibility to send notifications indicating when such packets are received on targeted interfaces. Processing logic then proceeds with necessary functions, such as authentication, after which a capable switch will dynamically create and configure appropriate access to the dynamically created VLAN or VLANs designated by the packet processing.

Tagged VLANs, on the other hand, require a different solution. For instance, consider the architecture 100 depicted at FIG. 1 when Virtual Machine 1 (VM1) 101 tagged traffic needs to be classified to VLAN "RED," and switch 2 105B lacks a VLAN "RED" pre-configuration. When VM1 101 transitions to PS3 120C (as indicated by the hashed arrow VM1 transition event 102 transitioning VM1 101 at PS1 120A to PS3 at 120C), the problem arises that switch 2 105B has no mechanism whatsoever to detect VM1's 101 MAC when the VLAN "RED" pre-configuration does not already exist. The problem therefore is how to enable switch 2 105B to correctly detect the MAC for VM1 101 in the absence of a VLAN "RED" pre-configuration when such transition from PS1 120A to PS3 120C occurs.

According to certain embodiments, a dynamic VLAN feature set may be improved to enable dynamically tagging VLANs so that already tagged VLANs may nevertheless be supported by dynamic VLAN capable network devices. For example, Extreme Network's XNV™ (ExtremeXOS Network Virtualization) Dynamic VLAN feature set may be so enabled through the improvements which are taught herein.

According to certain embodiments, dynamic VLAN support may be enabled for specifically identified ports of a network switch 105A-B. For example, the switches 105A-B may be configured to allow for already tagged traffic on each of one or more ports, based on the operations presented within the following process flow to accommodate already tagged VLAN traffic.

FIGS. 2A, 2B, and 2C illustrate exemplary process flows 201, 202, and 203, for dynamically tagging Virtual Local Area Networks (VLANs) in accordance with which embodiments may operate.

The method established by process flows 201, 202, and 203 may be performed by processing logic that may include hardware (e.g., circuitry, dedicated logic, programmable logic, microcode, etc.), software (e.g., instructions run on a processing device to perform various operations such receiving, forwarding, determining, processing, comparing, and transmitting packets, frames, and data), or some combination thereof. For example, a network switch having a Central Processing Unit (CPU) to perform the operations and memory to store the operations may be so enabled. Some of the blocks and/or operations listed below are optional in accordance with certain embodiments. The numbering of the blocks presented is for the sake of clarity and is not intended to prescribe an explicit order of operations in which the various blocks must occur.

At FIG. 2A, the method illustrated by process flows 201, 202, and 203 begins with processing logic at flow 201 for creating an internal VMAN and designating the referenced ports as "untagged" at block 205. An internal VMAN is created using a multiple VLAN header context with a technique known in the technical arts as provider bridging, stacked VLANs, QinQ or Q-in-Q as supported by the IEEE 802.1ad Ethernet networking standard (referred to also as the IEEE 802.1QinQ standard). Whereas the original 802.1Q specification allowed for only a single VLAN header to be inserted into an Ethernet frame, the extended 802.1QinQ functionality supported by 802.1ad allows for multiple VLAN headers to be inserted into a single frame. In the context of multiple VLAN headers, the term "VLAN tag" represents an "802.1Q VLAN header."

With the use of QinQ functionality, multiple VLAN tags in an Ethernet frame constitute a tag stack and a QinQ frame that has 2 VLAN 802.1Q headers is double-tagged, forming the tag stack. In a tag stack, push and pop operations are performed at the "outer" tag end of the stack, and thus, a tag added by a tag push operation becomes a new "outer" tag, thus causing an already present tag to become an "inner" tag. A tag pop operation will remove a current "outer" tag from the tag stack, thus moving a next "inner" tag to the "outer" tag position. In accordance with one embodiment to support the creation of an internal VMAN, an outer tag SVID is added to the packet (e.g., an SVID tag is "pushed" onto the Ethernet frame) and an already present CVID tag of the packet is then moved to an "inner" position within the Ethernet frame.

At block 210, processing logic enables software L2-MAC-Learning (Layer 2 Media Access Control address learning) mode for the referenced ports. Ordinarily, hardware learning mode is applied by default, but according to the described embodiment, enabling L2-MAC-Learning provides for a software learning mode within a network switch which allows for the consideration and application of policies during the enabled learning process. Operations 205 and 210 may be considered as switch configuration operations for a compatible network switch to support dynamically tagging VLANs and dynamic VLAN creation using already tagged VLAN packets.

Flow then proceeds to processing logic at block 215 for receiving, at a configured switch, a tagged packet from a tagged VLAN.

Processing logic at block 216 classifies the packet as belonging to the VMAN (SVID).

Processing logic at block 217 modifies the packet via the previously enabled L2-MAC-Learning processing to contain two VLAN tags, an inner tag and an outer tag. For example, the outer tag SVID may be added to the packet corresponding to a Service-VID or SVID and the inner tag may added to the packet corresponding to a Customer-VID or CVID.

At block 220, processing logic performs a source address MAC+SVID lookup ("MAC-SA+SVID") and at decision point 222 it is determined whether or not the lookup fails. According to the described embodiment, the received packet has already been classified as belonging to the VMAN (SVID) before reaching operation 220. In such an embodiment, the MAC-SA+SVID lookup search key is characterized as the MAC-SA[48 bits]+SVID[12 bits], and thus, makes no reference to the tagged VLAN from the wire in fulfillment of the MAC lookup operation. If "no," the lookup does not fail, then processing ends.

If "yes," the lookup does fail at decision point 222, then flow proceeds to flow 202 through block 223 indicating the MAC FDB address entry is unknown and to proceed to operations for dynamically creating a VLAN for a tagged packet.

At FIG. 2B, flow 202 begins at block 250 indicating that the MAC-SA+SVID lookup has failed in flow 201.

Flow then proceeds to processing logic at block 255 for sending the modified packet, including both VIDs to the previously enabled software L2-MAC-Learning process, for example, as enabled by a compatible CPU, circuit, or processor of a network switch, etc. Processing of the modified packet via the software L2-MAC-Learning process may, for example, reference a 12-bit VMAN identifier (SVID) associated with the internal VMAN created and setup during internal configuration of the switch (at flow 201, block 205) in which the internal VMAN was created with the referenced ports as "untagged."

At block 265, processing logic learns, via the L2-MAC-Learning processing, the MAC address in conjunction with the internal VMAN created in the switch configuration operations for the designated ports.

At block 275, processing logic receives and processes a learn notification from the L2-MAC-Learning processing indicating the new CVID MAC FDB entry.

At block 280, processing logic distributes the newly learned MAC entry via L2-MAC-Learning processing, including distribution of the new CVID MAC FDB entry to other modules within the network element.

At block 285, processing logic receives the newly learned CVID MAC FDB entry and cross references it to an associated Virtual Port Profile (VPP) so as to determine validity.

At block 290, processing logic validates whether or not the CVID is a valid dynamic tagged VLAN based on the newly learned CVID MAC FDB entry and the associated VPP and at decision point 292, it is determined whether or not the CVID is a valid dynamic tagged VLAN.

If "no," the CVID is not a valid dynamic tagged VLAN, then processing ends due to the failed validity test of the CVID against the Virtual Port Profile. For example, a policy or profile may dictate the packet simply is dropped. The Virtual Port Profile may be stored locally within a compatible network switch or may be retrieved on an ad-hoc basis from, for example, a network management station having centralized profile responsibility for the switches.

Conversely, if "yes," the CVID is a valid dynamic tagged VLAN, then processing proceeds FIG. 2C which sets forth the dynamic VLAN creation operations of flow 203.

At FIG. 2C, flow 203 begins at block 293 indicating that the CVID has been validated as a dynamic tagged VLAN at flow 202 and that the VLAN should be dynamically created.

At block 294, processing logic dynamically creates the tagged VLAN and further adds the associated port as tagged so that subsequent tagged packets can be forwarded via the appropriate broadcast domain.

At block 295, processing logic creates a MAC FDB entry on the dynamically created tagged VLAN.

At block 296, processing logic distributes the MAC FDB entry for the dynamically created tagged VLAN to other modules within the network element.

And at block 297, processing logic deletes the MAC FDB entry from the internal VMAN created at flow 202. Processing logic deletes the MAC FDB entry because all new packets coming in will be handled with the 802.1Q tag as their source MAC and VLAN tag will already be known. It is necessary to delete the MAC FDB entry from the internal VMAN so as to allow for a change in the tag at some point in the future. For example, where the first packet for a tagged VLAN is processed according to the described flow, by deleting the MAC FDB entry from the internal VMAN, any change to that tag in the future can trigger the first packet received for a tagged VLAN to again be subjected to the same processing, where the appropriate VLAN may be again discovered, without erroneously matching due to a stale MAC FDB entry on the internal VMAN. However, deletion and rediscovery can be controlled by policy or profiles so as to prevent such rediscovery if necessary.

Moreover, multiple VLANs may exist on the same port of a network switch having separation for various services, such as voice, data, etc. Separate customers may also be supported through multiple VLANs on the same port as the VLANs operating as logical broadcast domains as explained above. Accordingly, it is permissible to have a single port with multiple VLANs overlaid thereupon, including those corresponding to distinct customers and/or services.

The operational blocks 293 through 297 are thus part of processing for dynamic VLAN creation for a first tagged packet received which is reached after the failed lookup determination at decision point 222 of flow 201 and the successful validity determination of decision point 292 at flow 202.

From processing block 297, processing returns to flow 201 where additional packets may be received and processed in an iterative fashion. Because subsequent tagged packets having the same source MAC address received from the same VLAN are now known, they will be properly assigned to the tagged VLAN indicated which was dynamically created via the processing above and then forwarded pursuant to a hit on the MAC address according to the destination lookup sequence. A newly received tagged packet for a VLAN which still requires dynamic creation (e.g., a first packet of a newly tagged VLAN) will similarly be subjected to the necessary processing and checks according to the flow established above so as to establish the appropriate forwarding means through dynamic VLAN creation for already tagged VLAN packets.

Figure 3:
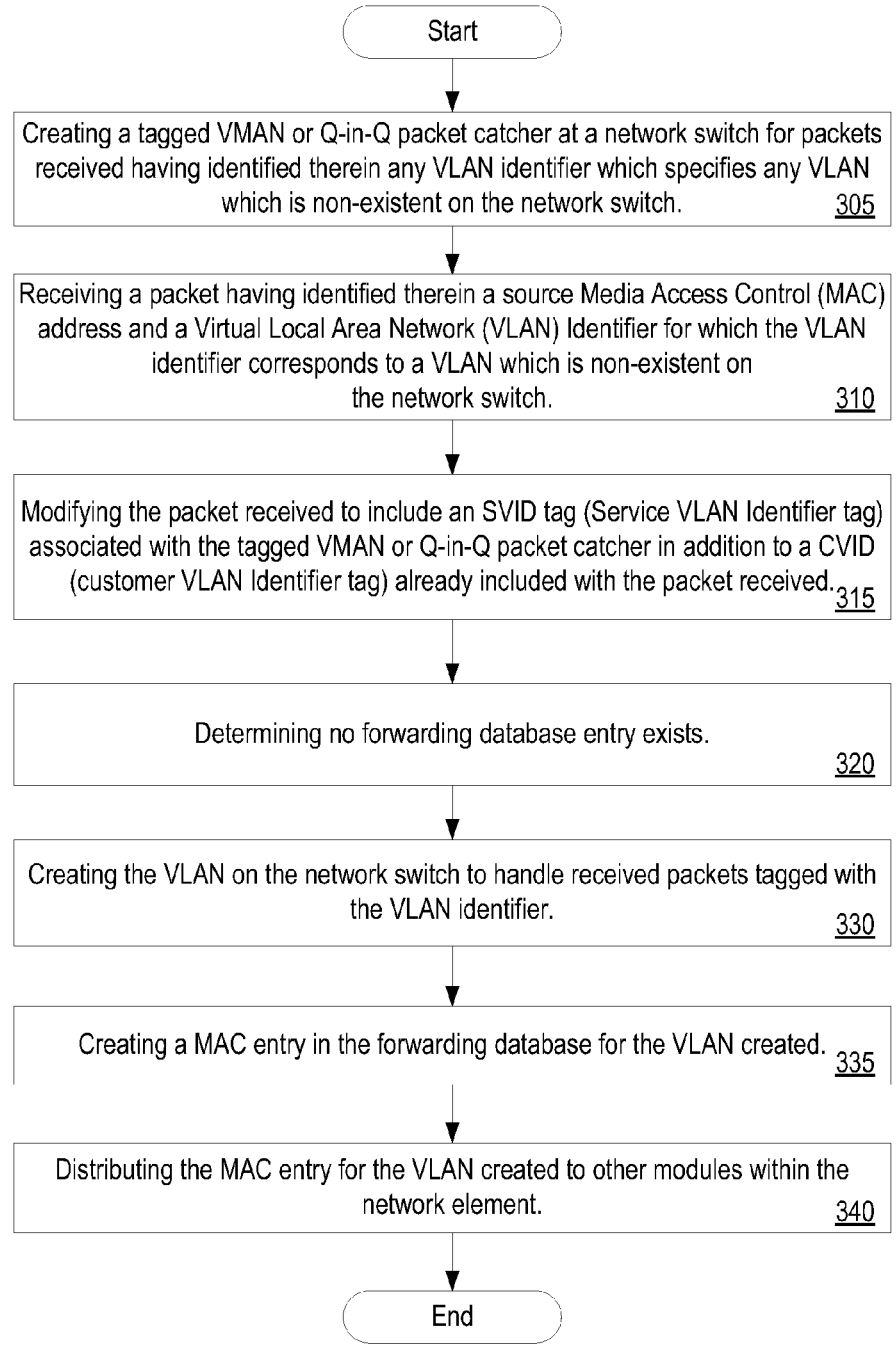
FIG. 3 illustrates an alternative exemplary process flow for dynamically tagging VLANs in accordance with which embodiments may operate.

FIG. 3 illustrates an alternative exemplary process flow 300 for dynamically tagging VLANs in accordance with which embodiments may operate.

The method set forth by flow 300 begins with processing logic at block 305 for creating a tagged VMAN utilizing 802.1ad provider bridging/stacked VLAN functionality, thus forming a packet catcher at a network switch for packets received having identified therein any VLAN identifier which specifies any VLAN which is non-existent on the network switch. This operation configures the switch to accept tagged VLAN packets which are directed toward a yet to be assigned VLAN.

Processing logic at block 310 receives a packet having identified therein a source Media Access Control (MAC) address and a Virtual Local Area Network (VLAN) Identifier for which the VLAN identifier corresponds to a VLAN which is non-existent on the network switch. For example, a first packet among a stream of packets directed to the same identified VLAN will be subject to the special processing where it is caught by the VMAN or queue in queue (Q-in-Q) as a single 802.1Q queued packet and is then treated as an unqueued packet.

Processing logic at block 315 modifies the packet received to include an SVID tag (Service VLAN Identifier tag) associated with the tagged VMAN or Q-in-Q packet catcher in addition to a CVID (customer VLAN Identifier tag) already included with the packet received. Thus, any time there is a dynamic VLAN tag anticipated, an internal VMAN on the ingress port can be utilized as a catcher for the packet lacking an appropriately pre-assigned VLAN for the corresponding VLAN tag of the packet. The modification thus associates the source MAC address and the CVID tag. Software learning may look at control bits passed from hardware into a buffer structure and queue the operation for processing logic to populate the MAC forwarding database, for example, by adding a CVID tag entry into the MAC forwarding database. Rather than using the VLAN ID and the source MAC as the key to the forwarding database, packet learning functionality instead will utilize the associated SVID tag derived from the VMAN packet catcher along with the learned source MAC address for the packet as the key.

The CVID tag entry introduced to the forwarding database is distributed along with the MAC learning portion to other modules within the network element (e.g., the switch having the processing logic, etc.) and the MAC address and is cross referenced to an outside policy or profile, such as a Virtual Port Profile (VPP) which then further validates whether the CVID portion distributed with the learned source MAC is a valid tag in compliance with the policy or profile for the requested configuration. Through this process, the source MAC address and tagged VLAN are then associated via the CVID.

At block 320 processing logic then determines that no forwarding database entry exists.

Processing logic at block 330 then creates the VLAN on the network switch to handle received packets tagged with the VLAN identifier. The VLAN created is the tagged VLAN for the packet which was previously non-existent on the network switch, but is now dynamically created to handle packets having the VLAN Identifier indicated by the first received packet. A VLAN manager may be utilized to create the new VLAN which then adds the associated ingress port for the packet as tagged and further distributes the information down into the hardware of the network switch so as to enable hardware based port membership handling for packets. New packets that arrive with the 802.1Q VLAN tag and the CVID tag can therefore be handled by the port membership hardware for the VLAN and the port combination, thus resulting in hardware handling and forwarding rather than processing through the dummy VMAN catcher. Thus, while the first packet is classified as belonging to the VMAN and not to the VLAN specified due to a lack of the VLAN on the network switch, subsequent packets will encounter normal processing for an already known and established VLAN corresponding to their VLAN identifier.

Processing logic at block 335 creates a MAC entry in the forwarding database for the VLAN created and processing logic at block 340 distributes the MAC entry for the VLAN created to other modules within the network element.

In accordance with one embodiment, there is a non-transitory computer readable storage medium having instructions stored thereon that, when executed by a processor of a network switch, the instructions cause the network switch to perform operations including: receiving a packet having identified therein a source Media Access Control (MAC) address and a Virtual Local Area Network (VLAN) Identifier, wherein the VLAN identifier corresponds to a VLAN which is non-existent on the network switch; determining no forwarding database entry exists for the source MAC address of the packet received; modifying the packet received to include two VLAN tags, a first VLAN tag corresponding to the VLAN identifier identified within the packet received and a second VLAN tag, distinct from the first; and creating the VLAN on the network switch to handle received packets tagged with the VLAN identifier. In one embodiment, the instructions further cause the network switch to perform operations including creating a tagged Virtual Metro Area Network (VMAN)

packet catcher at the network switch for packets received having identified therein any VLAN identifier which specifies any VLAN which is non-existent on the network switch; and modifying any packet received by the tagged VMAN packet catcher to include an SVID tag (Service VLAN Identifier tag) in addition to a CVID (customer VLAN Identifier tag) already included with such packets.

Figure 4:
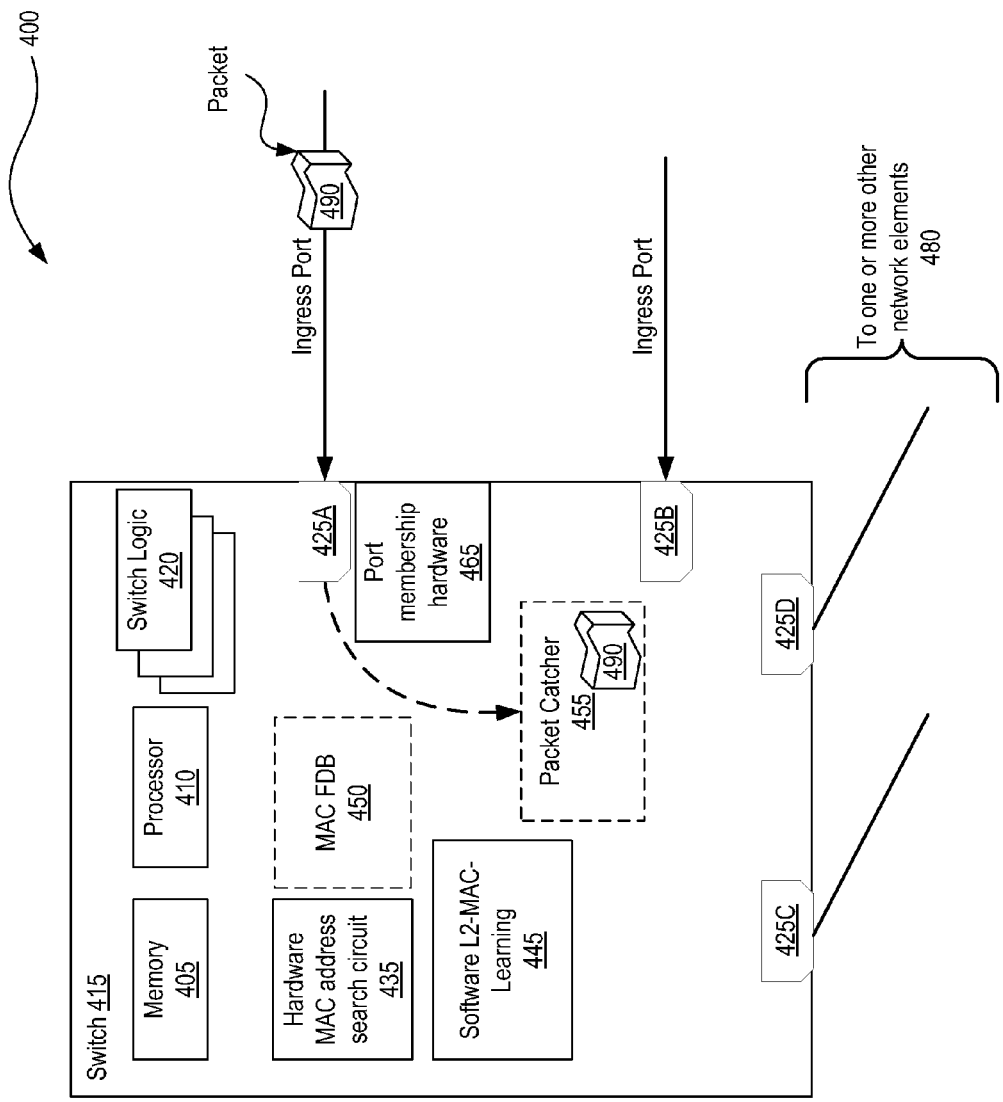
FIG. 4 illustrates an exemplary architecture of a network switch in accordance with which embodiments may operate.

FIG. 4 illustrates an exemplary architecture 400 of a network switch 415 in accordance with which embodiments may operate. The switch depicted includes a memory 405, processor 410, switch logic 420, four physical ports 425A and 425B indicated as ingress ports and 425C and 425D leading to one or more other network elements 480. Network switch 415 further includes a hardware MAC address search circuit 435, a MAC FDB 450, a packet catcher 455, and a software L2-MAC-Learning 445 component.

In accordance with one embodiment, the network switch 415 having therein the memory 405 to store processing logic (e.g., switch logic 420) and the processor 410 to execute processing logic or switch logic 420 utilizes its ingress port 425A to receive a packet 490 having identified therein a source Media Access Control (MAC) address and a Virtual Local Area Network (VLAN) Identifier, in which the VLAN identifier corresponds to a VLAN which is non-existent on the network switch. Software L2-MAC-Learning 445 component is to modify the packet received to include two VLAN tags, a first VLAN tag corresponding to the VLAN identifier identified within the packet received and a second VLAN tag, distinct from the first thus associating the source MAC address and the VLAN identifier of the received packet with the second VLAN tag. A hardware MAC address search circuit 435 of the network switch 415 is to determine that no forwarding database entry exists for the source MAC address of the packet received. Processing logic or switch logic 420 further creates the VLAN on the network switch to handle received packets tagged with the VLAN identifier.

In one embodiment, the ingress port 425A of the network switch 415 is serviced by a tagged Virtual Metro Area Network (VMAN) packet catcher 455 at the network switch 415 for packets 490 received having identified therein any VLAN identifier which specifies any VLAN which is non-existent on the network switch. In one embodiment, the software L2-MAC-Learning 445 component modifies any packet received by the tagged VMAN packet catcher 455 to include an SVID tag (Service VLAN Identifier tag) in addition to a CVID (customer VLAN Identifier tag) already included with such packets that are received. According to one embodiment, the software L2-MAC-Learning 445 component is added to the Extreme Network XNV™ (ExtremeXOS Network Virtualization) Dynamic VLAN feature set.

In one embodiment, the tagged VMAN packet catcher 455 services one or more untagged ingress ports 425A-B of the network switch 415 and network layer 2 MAC address learning mode is enabled for the one or more ingress ports 425A-B via the software L2-MAC-Learning 445 component.

In one embodiment, port membership hardware 465 for the ingress port 425A is to handle port forwarding for any packet subsequent to the packet received having a VLAN identifier and ingress port combination matching that of the packet 490 initially received.

FIG. 5 illustrates an alternative exemplary architecture 500 of a host network switch 515 to receive an integrated circuit 511B in accordance with which embodiments may operate.

In accordance with the disclosed embodiments, network switch 515 may be enabled to perform the disclosed functions via a memory 405 to store, and a processor 410 to execute logic blocks 520 as discussed above with respect to FIG. 4. In alternative embodiments, network switch 515 is enabled to perform the disclosed functions via a specialized integrated circuit 511B which is designed to perform the disclosed operations. For example, in one embodiment, a network switch 515 includes an integrated circuit (IC) 511A having a plurality of logic blocks 520 and additional circuitry capable to store and execute appropriate functions.

For example, integrated circuit 511A according to one embodiment includes an input 512 to receive a packet having identified therein a source Media Access Control (MAC) address and a Virtual Local Area Network (VLAN) Identifier, wherein the VLAN identifier corresponds to a VLAN which is non-existent within a host network switch 515; a hardware MAC address search circuit 513 to determine that no forwarding database entry exists for the source MAC address of the packet received; and a L2-MAC-Learning component 514 to modify the packet received to include two VLAN tags, a first VLAN tag corresponding to the VLAN identifier identified within the packet received and a second VLAN tag, distinct from the first. According to such an embodiment, a first logic block 520 of IC 511B is to associate the source MAC address and the VLAN identifier of the received packet with the second VLAN tag and a second logic block 520 is to create the VLAN within the host network switch 515 to handle received packets tagged with the VLAN identifier.

Further still, Integrated Circuit 511B is depicted as yet to be installed into a network switch 515. Yet to be installed Integrated Circuit 511B nevertheless retains its plurality of logic blocks 520 circuitry elements 512, 513, and 514, and logic capable to store and execute appropriate functions as described above with regard to the IC 511A which is depicted as having been installed within host network switch 515.

Such an IC 511A and 511B may be designed as a System On a Chip (SOC) integrated circuit; designed as a Field-programmable Gate Array (FPGA) integrated circuit; designed as an Application-Specific Integrated Circuit (ASIC); or designed as a Programmable Logic Device (PLD) integrated circuit. The IC 511A and 511B may further include an input 512 and an output, each adapted to be physically coupled with a communications bus of the host switch, such as a network switch 515.

Certain functionality described herein may be performed by hardwarized or hardware implemented logic units or modules. For example, a hardware based packet forwarder, a hardware based Media Access Control (MAC) address lookup, a hardware based packet modifier capable to add and edit tags of a packet subject to processing, and/or a hardware VMAN and VLAN tag determiner (e.g., such as a hardware multiplexer) configured with or within a CPU processor and accompanying memory of a networking device, network switch, and so forth, are in accordance with the embodiment described herein.

While embodiments have been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the invention is therefore determined in reference to the appended claims, along with the full scope of equivalents to which such claims are entitled.

What is claimed is:

1. A method in a network switch having a processor and a memory therein, wherein the method comprises:
   receiving a packet having identified therein a source Media Access Control (MAC) address and a Virtual Local Area Network (VLAN) Identifier within a Customer VLAN Identifier (LVID) tag of the packet received, wherein the VLAN identifier corresponds to a VLAN which is non-existent on the network switch;
   modifying the packet received to include two VLAN tags, a first VLAN tag corresponding to the VLAN identifier within the CVID tag of the packet received and a second VLAN tag, distinct from the first, wherein modifying the packet with the first and the second VLAN tags associates the source MAC address with the CVID tag of the packet received;
   determining no forwarding database entry exists for the modified packet; and
   creating the VLAN on the network switch to handle received packets tagged with the VLAN identifier.

2. The method of claim 1, further comprising:
   creating a tagged Virtual Metro Area Network (VMAN) packet catcher at the network switch for packets received having identified therein any VLAN identifier which specifies any VLAN which is non-existent on the network switch; and
   modifying any packet received by the tagged VMAN packet catcher to include an SVID tag (Service VLAN Identifier tag) in addition to a CVID (customer VLAN Identifier tag) already included with such packets.

3. The method of claim 2, wherein the tagged VMAN packet catcher prevents the network switch from dropping packets having been tagged with a VLAN identifier for which no corresponding VLAN exists on the network switch due to a lack of forwarding information to the non-existent VLAN.

4. The method of claim 1, further comprising:
   configuring the network switch to support dynamic VLAN allocation for received packets having a VLAN tag identifying a non-existent VLAN of the network switch, wherein the configuring comprises at least:
   (a) creating an internal Virtual Metro Area Network (VMAN) for one or more ingress ports of the network switch;
   (b) designating the one or more ingress ports as untagged ports; and
   (c) enabling layer 2 MAC address learning mode for the one or more ingress ports to perform the modifying operation.

5. The method of claim 1, wherein modifying the packet further comprises associating the source MAC address and the VLAN identifier with the second VLAN tag.

6. The method of claim 1, wherein receiving the packet comprises:
   receiving the packet at an ingress port of the network switch configured with a packet catcher for VLAN tagged packets identifying any non-existent VLAN within the network switch; and
   wherein creating the VLAN on the network switch to handle received packets tagged with the VLAN identifier comprises configuring the ingress port of the network switch as tagged for the created VLAN so that subsequent packets tagged with the VLAN identifier will be handled by port membership hardware for the ingress port based on a combination of the VLAN identifier and ingress port used by the subsequent packets.

7. The method of claim 1, wherein determining no forwarding database entry exists comprises:
   a hardware MAC address search circuit to perform a lookup and indicate a no entry result, wherein the lookup comprises a search key characterized by MAC-SA+SVID including a MAC source address of the packet and an SVID tag (Service VLAN Identifier tag), introduced to the packet when modified.

8. The method of claim 7, wherein modifying the packet received to include two VLAN tags comprises software L2-MAC-Learning to modify the packet responsive to the hardware MAC address search circuit indicating the no entry result.

9. The method of claim 1, wherein modifying the packet received to include two VLAN tags comprises:
   modifying the packet with an outer an SVID tag (Service VLAN Identifier tag) newly introduced to the packet and further modifying the packet with an inner CVID tag corresponding to a CVID tag which was received with the packet at an ingress port of the network switch.

10. The method of claim 9, further comprising:
    adding the inner CVID tag information to the forwarding database; and
    validating the inner CVID tag represents a valid dynamic tagged VLAN based on the inner CVID tag information in the forwarding database and based further on compliance with a Virtual Port Profile (VPP).

11. The method of claim 10, wherein:
    (a) when the inner CVID tag represents a valid dynamic tagged VLAN, then permitting creating the VLAN on the network switch to handle received packets tagged with the VLAN identifier; or
    (b) when the inner CVID tag does not represent a valid dynamic tagged VLAN, then dropping the packet received.

12. The method of claim 11, further comprising:
    deleting the inner CVID tag information from the forwarding database responsive to successfully creating the VLAN on the network switch to handle received packets tagged with the VLAN identifier.

13. The method of claim 1, wherein creating the VLAN on the network switch to handle received packets tagged with the VLAN identifier further comprises:
    creating a MAC entry in the forwarding database for the VLAN created; and
    distributing the MAC entry for the VLAN created to other modules within the network element.

14. A network switch comprising:
    a memory to store processing logic;
    a processor to execute processing logic;
    an ingress port to receive a packet having identified therein a source Media Access Control (MAC) address and a Virtual Local Area Network (VLAN) Identifier within a Customer VLAN Identifier (CVID) tag of the packet received, wherein the VLAN identifier corresponds to a VLAN which is non-existent on the network switch;
    software L2-MAC-Learning to modify the packet received to include two VLAN tags, a first VLAN tag corresponding to the VLAN identifier within the CVID tag of the packet received and a second VLAN tag, distinct from the first, wherein modifying the packet with the first and the second VLAN tags associates the source MAC address with the CVID tag of the packet received;
    a hardware MAC address search circuit determine that no forwarding database entry exists for the modified packet; and
    wherein the processing logic is to create the VLAN on the network switch to handle received packets tagged with the VLAN identifier.

15. The network switch of claim 14:
wherein the ingress port of the network switch is serviced by a tagged Virtual Metro Area Network (VMAN) packet catcher at the network switch for packets received having identified therein any VLAN identifier which specifies any VLAN which is non-existent on the network switch; and
wherein the software L2-MAC-Learning is to further modify any packet received by the tagged VMAN packet catcher to include an SVID tag (Service VLAN Identifier tag) in addition to a CVID (customer VLAN Identifier tag) already included with such packets.

16. The network switch of claim 15:
wherein the tagged VMAN packet catcher services one or more untagged ingress ports of the network switch; and
wherein the network layer 2 MAC address learning mode is enabled for the one or more ingress ports via the software L2-MAC-Learning.

17. The network switch of claim 14, further comprising:
port membership hardware for the ingress port to handle port forwarding for any packet subsequent to the packet received having a VLAN identifier and ingress port combination matching that of the packet received.

18. The network switch of claim 14, wherein the software L2-MAC-Learning is to modify the packet comprises modifying the packet with an outer an SVID tag (Service VLAN Identifier tag) newly introduced to the packet and further modifying the packet with an inner CVID tag corresponding to a CVID tag which was received with the packet at the ingress port of the network switch.

19. The network switch of claim 18, wherein the processing logic is to further:
add the inner CVID tag information to the forwarding database; and
validate the inner CVID tag represents a valid dynamic tagged VLAN based on the inner CVID tag information in the forwarding database and based further on compliance with a Virtual Port Profile (VPP) designating allowable configurations.

20. The network switch of claim 19, wherein the processing logic is to further:
delete the inner CVID tag information from the forwarding database responsive to successfully creating the VLAN on the network switch to handle received packets tagged with the VLAN identifier.

21. The network switch of claim 14, wherein the processing logic to create the VLAN on the network switch to handle received packets tagged with the VLAN identifier further comprises the processing logic to:
create a MAC entry in the forwarding database for the VLAN created; and
distribute the MAC entry for the VLAN created to other modules within the network element.

22. An integrated circuit comprising:
an input to receive a packet having identified therein a source Media Access Control (MAC) address and a Virtual Local Area Network (VLAN) Identifier within a Customer VLAN Identifier (CVID) tag of the packet received, wherein the VLAN identifier corresponds to a VLAN which is non-existent within a host network switch;
a L2-MAC-Learning component to modify the packet received to include two VLAN tags, a first VLAN tag corresponding to the VLAN identifier within the CVID tag of the packet received and a second VLAN tag, distinct from the first, wherein modifying the packet with the first and the second VLAN tags associates the source MAC address with the CVID tag of the packet received;
a hardware MAC address search circuit to determine that no forwarding database entry exists for the modified packet; and
a second logic block to create the VLAN within the host network switch to handle received packets tagged with the VLAN identifier.

23. The integrated circuit of claim 22,
wherein the input is coupled to an ingress port of the host network switch to receive the packet;
wherein a third logic block is to establish a tagged Virtual Metro Area Network (VMAN) packet catcher at the host network switch to service packets received having identified therein any VLAN identifier which specifies any VLAN which is non-existent on the network switch; and
wherein the L2-MAC-Learning component is to further modify any packet received by the tagged VMAN packet catcher to include an SVID tag (Service VLAN Identifier tag) in addition to a CVID (customer VLAN Identifier tag) already included with such packets.

24. The integrated circuit of claim 22, wherein the integrated circuit is selected from the group comprising:
a System On a Chip (SOC) integrated circuit;
a Field-programmable Gate Array (FPGA) integrated circuit;
an Application-Specific Integrated Circuit (ASIC); and
a Programmable Logic Device (PLD) integrated circuit.

25. A non-transitory computer readable storage medium having instructions stored thereon that, when executed by a processor of a network switch, the instructions cause the network switch to perform operations including:
receiving a packet having identified therein a source Media Access Control (MAC) address and a Virtual Local Area Network (VLAN) Identifier within a Customer VLAN Identifier (LVID) tag of the packet received, wherein the VLAN identifier corresponds to a VLAN which is non-existent on the network switch;
modifying the packet received to include two VLAN tags, a first VLAN tag corresponding to the VLAN identifier within the CVID tag of the packet received and a second VLAN tag, distinct from the first, wherein modifying the packet with the first and the second VLAN tags associates the source MAC address with the CVID tag of the packet received;
determining no forwarding database entry exists for the modified packet; and
creating the VLAN on the network switch to handle received packets tagged with the VLAN identifier.

26. The non-transitory computer readable storage medium of claim 25, wherein the instructions cause the network switch to perform operations further including:
creating a tagged Virtual Metro Area Network (VMAN) packet catcher at the network switch for packets received having identified therein any VLAN identifier which specifies any VLAN which is non-existent on the network switch; and
modifying any packet received by the tagged VMAN packet catcher to include an SVID tag (Service VLAN Identifier tag) in addition to a CVID (customer VLAN Identifier tag) already included with such packets.

27. The non-transitory computer readable storage medium of claim 25, wherein modifying the packet received to include two VLAN tags comprises:
modifying the packet with an outer an SVID tag (Service VLAN Identifier tag) newly introduced to the packet and further modifying the packet with an inner CVID tag corresponding to a CVID tag which was received with the packet at an ingress port of the network switch.

28. The non-transitory computer readable storage medium of claim 27, wherein the instructions cause the network switch to perform operations further including:
   adding the inner CVID tag information to the forwarding database; and
   validating the inner CVID tag represents a valid dynamic tagged VLAN based on the inner CVID tag information in the forwarding database and based further on compliance with a Virtual Port Profile (VPP).

29. The non-transitory computer readable storage medium of claim 28, wherein the instructions cause the network switch to perform operations further including:
   deleting the inner CVID tag information from the forwarding database responsive to successfully creating the VLAN on the network switch to handle received packets tagged with the VLAN identifier.

30. The non-transitory computer readable storage medium of claim 25, wherein creating the VLAN on the network switch to handle received packets tagged with the VLAN identifier further comprises:
   creating a MAC entry in the forwarding database for the VLAN created; and
   distributing the MAC entry for the VLAN created to other modules within the network element.

* * * * *